(12) United States Patent
Stowasser et al.

(10) Patent No.: US 11,352,919 B2
(45) Date of Patent: Jun. 7, 2022

(54) METHOD AND DEVICE FOR ACTUATING A CAMSHAFT ADJUSTER

(71) Applicant: Vitesco Technologies GmbH, Hannover (DE)

(72) Inventors: Wolfgang Stowasser, Munich (DE); Suk-Ju Kim, Munich (DE); Thomas Burkhardt, Munich (DE)

(73) Assignee: VITESCO TECHNOLOGIES GMBH, Hannover (DE)

( * ) Notice: Subject to any disclaimer, the term of this patent is extended or adjusted under 35 U.S.C. 154(b) by 80 days.

(21) Appl. No.: 16/755,584

(22) PCT Filed: Oct. 8, 2018

(86) PCT No.: PCT/EP2018/077342
§ 371 (c)(1),
(2) Date: Apr. 12, 2020

(87) PCT Pub. No.: WO2019/072771
PCT Pub. Date: Apr. 18, 2019

(65) Prior Publication Data
US 2021/0189919 A1     Jun. 24, 2021

(30) Foreign Application Priority Data
Oct. 13, 2017  (DE) ..................... 10 2017 218 333.0

(51) Int. Cl.
*F01L 9/20*     (2021.01)
*F01L 9/40*     (2021.01)
(Continued)

(52) U.S. Cl.
CPC ................. *F01L 9/20* (2021.01); *F01L 1/344* (2013.01); *F01L 9/40* (2021.01); *F02D 41/061* (2013.01);
(Continued)

(58) Field of Classification Search
CPC ..... F01L 9/20; F01L 9/40; F01L 1/344; F01L 2009/4094; F01L 2009/4088;
(Continued)

(56) References Cited

U.S. PATENT DOCUMENTS 7,584,729 B2   9/2009  Tanaka et al. ............. 123/90.15
7,765,968 B2   8/2010  Mashiki et al. ........... 123/90.17
(Continued)

FOREIGN PATENT DOCUMENTS

CN   105829665 A   8/2016   ............. F01L 1/356
CN   106661970 A   5/2017   ............. F01L 1/344
(Continued)

OTHER PUBLICATIONS

Chinese Office Action, Application No. 201880066762.8, 13 pages, dated May 25, 2021.
(Continued)

*Primary Examiner* — Jacob M Amick
*Assistant Examiner* — Charles J Brauch
(74) *Attorney, Agent, or Firm* — Slayden Grubert Beard PLLC

(57) ABSTRACT

Various embodiments include a method for actuating a camshaft adjuster of an internal combustion engine, in which a current is generated in an electric motor of the camshaft adjuster comprising: measuring an instantaneous strength of the current; calculating a mean value of the measured strength of the current over a predefined elapsed time; measuring a temperature of the camshaft adjuster; comparing the mean value of the measured strength of the current to a threshold value obtained from a characteristic diagram stored in a memory based on the measured temperature and the predefined elapsed time; and reducing the current if the calculated mean value of the strength of the current is higher than the threshold value.

11 Claims, 2 Drawing Sheets

(51) Int. Cl.
*F01L 1/344* (2006.01)
*F02D 41/06* (2006.01)
*F02D 41/24* (2006.01)

(52) U.S. Cl.
CPC ....... *F02D 41/062* (2013.01); *F02D 41/2422* (2013.01); *F02D 41/2425* (2013.01); *F02D 41/2429* (2013.01); *F02D 41/2493* (2013.01); *F02D 41/2496* (2013.01); *F01L 2009/4088* (2021.01); *F01L 2009/4094* (2021.01); *F01L 2800/03* (2013.01); *F01L 2800/11* (2013.01); *F01L 2820/032* (2013.01)

(58) Field of Classification Search
CPC ............... F01L 2800/03; F01L 2800/11; F01L 2820/032; F01L 2800/01; F01L 1/352; F02D 41/061; F02D 41/062; F02D 41/2422; F02D 41/2425; F02D 41/2429; F02D 41/2493; F02D 41/2496; F02D 13/02; H02P 29/60
See application file for complete search history.

(56) References Cited

U.S. PATENT DOCUMENTS

| | | | | |
|---|---|---|---|---|
| 8,766,562 | B2 | 7/2014 | Schaefer et al. | 318/12 |
| 9,225,283 | B2 | 12/2015 | Morita et al. | |
| 10,865,716 | B2 | 12/2020 | Braun et al. | |
| 2008/0065308 | A1 | 3/2008 | Tanaka et al. | 701/102 |
| 2008/0081702 | A1 | 4/2008 | Tanaka et al. | 464/1 |
| 2013/0192549 | A1 | 8/2013 | Katoh et al. | 123/90.15 |
| 2014/0216374 | A1 | 8/2014 | Tadokoro et al. | 123/90.15 |
| 2016/0376946 | A1 | 12/2016 | Kajiura | 123/90.15 |

FOREIGN PATENT DOCUMENTS

| | | | | |
|---|---|---|---|---|
| DE | 4110195 | A1 | 10/1992 | F01L 1/344 |
| DE | 102007000471 | A1 | 3/2008 | F01L 1/352 |
| DE | 102007000473 | A1 | 3/2008 | F01L 1/344 |
| DE | 102008059005 | A1 | 5/2010 | F01L 1/344 |
| DE | 102013016337 | A1 | 4/2014 | H02P 27/08 |
| DE | 102014226631 | A1 | 6/2016 | F01L 1/00 |
| EP | 1777792 | A2 | 4/2007 | H02H 7/08 |
| EP | 2057364 | B1 | 12/2016 | F01L 1/352 |
| JP | 2005218281 | A * | 8/2005 | |
| JP | 2005218281 | A | 8/2005 | F01L 9/04 |
| JP | 2008054440 | A | 3/2008 | B62D 5/04 |
| JP | 2009225615 | A * | 10/2009 | |
| JP | 2009225615 | A | 10/2009 | H02P 27/06 |
| WO | 2019/072771 | A1 | 4/2019 | F01L 1/352 |

OTHER PUBLICATIONS

Korean Office Action, Application No. 1020207013606, 11 pages, dated Apr. 29, 2021.
German Office Action, Action No. 102017218333.0, 7 pages, dated Jan. 29, 2018.
International Search Report and Written Opinion, Application No. PCT/EP2018/077342, 19 pages, dated Feb. 1, 2019.

* cited by examiner

| T \ t | 1 | 10 | 30 | 60 | 120 | 300 | 600 |
|---|---|---|---|---|---|---|---|
| 0 | 40 | 40 | 40 | 40 | 37 | 28 | 19 |
| 80 | 40 | 40 | 30 | 22 | 15 | 12 | 9 |
| 120 | 40 | 34 | 22 | 15 | 11 | 10 | 8,5 |

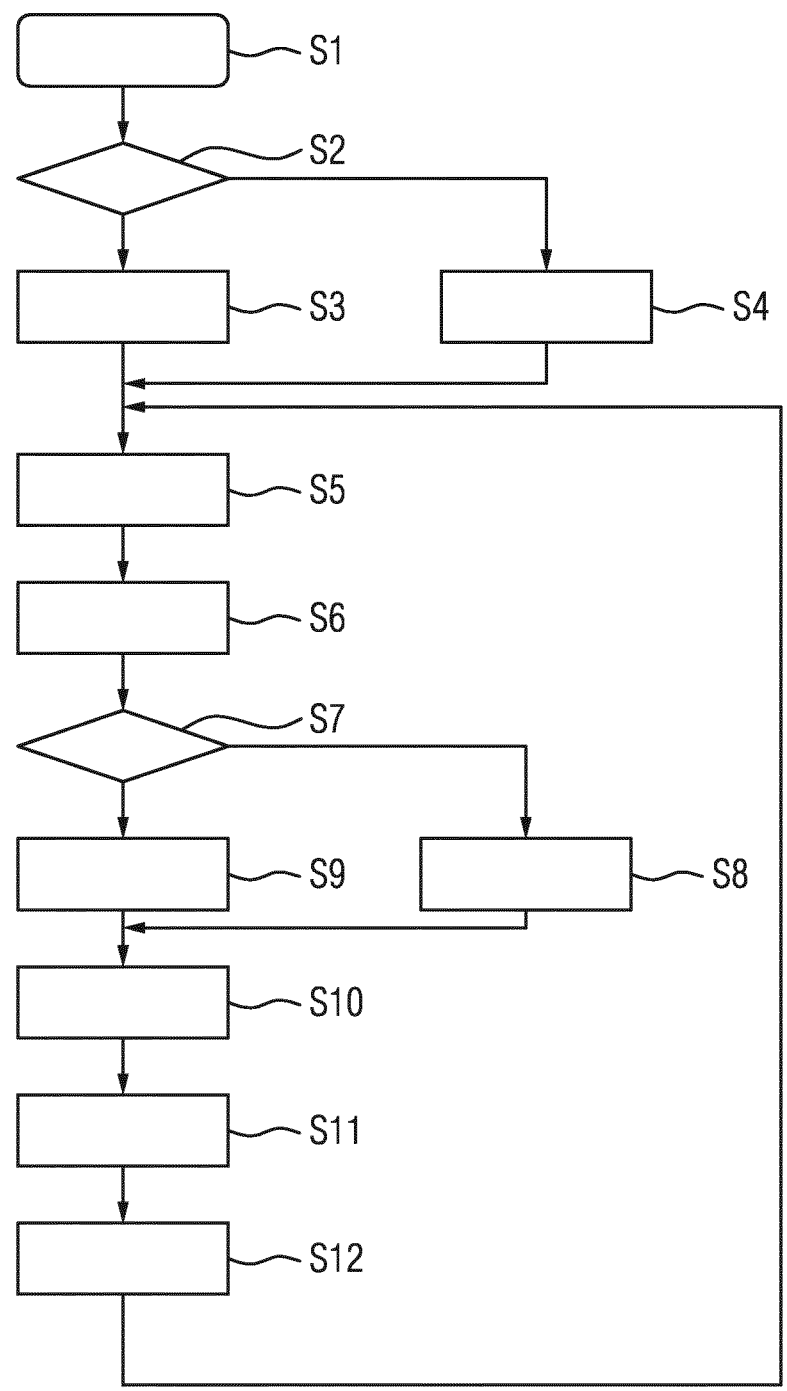

METHOD AND DEVICE FOR ACTUATING A CAMSHAFT ADJUSTER

CROSS-REFERENCE TO RELATED APPLICATIONS

This application is a U.S. National Stage Application of International Application No. PCT/EP2018/077342 filed Oct. 8, 2018, which designates the United States of America, and claims priority to DE Application No. 10 2017 218 333.0 filed Oct. 13, 2017, the contents of which are hereby incorporated by reference in their entirety.

TECHNICAL FIELD

The present disclosure relates to engines. Various embodiments may include methods and/or devices for actuating a camshaft adjuster.

BACKGROUND

In motor vehicles, electric camshaft adjusters are being increasingly used to increase efficiency. Such camshaft adjusters make possible a relatively large adjustment range with later closing points of the inlet camshaft adjusters in comparison with conventional hydraulic adjusters. As result, other combustion methods, for example according to an Atkinson cycle, can be used.

DE 41 10 195 A1 describes an adjustment device for two assemblies which have a rotating drive connection, in particular for the relative adjustment of a camshaft with respect to the drive wheel driving it. This adjustment device has a control gear which is arranged between the camshaft and the drive wheel driving it and which can be driven by means of an electric motor. The stator of the electric motor is arranged in a positionally fixed fashion. The control gear is mounted together with the rotor of the electric motor on a shaft element so as to be relatively rotatable with respect to the camshaft.

US 2014/0216374 A1 describes a further camshaft adjuster which has an electric motor. In this known camshaft adjuster, the stator of electric motor rotates with the camshaft.

The camshaft position for an ideal cold start is usually not located at one of the mechanical end stops but instead within this adjustment range. If the camshaft position differs from the ideal starting position, the starting process can become longer. In the most unfavourable case, the internal combustion engine may even no longer start at all. Depending on the design of the respective system, the electric drive of the cam shaft adjuster may not be designed to continuously output its maximum possible power. If this maximum power is nevertheless required over a relatively long time period, the drive may heat up to such an extent that the drive system overheats and fails.

SUMMARY

The teachings of the present disclosure describe various methods and devices with which the probability of thermal overloading of the camshaft adjuster is reduced. For example, some embodiments include a method for actuating a camshaft adjuster of an internal combustion engine, in which a flow of current is generated in an electric motor of the camshaft adjuster, having the following steps: measuring the instantaneous strength of the current in the camshaft adjuster, calculating a mean value of the measured strength of the current for a predefined timebase, measuring the ambient temperature of the camshaft adjuster, comparing the mean value of the measured strength of the current with a threshold value which is obtained from a characteristic diagram memory and is associated with the measured ambient temperature and the predefined timebase, and reducing the instantaneous strength of the current in the camshaft adjuster if the calculated mean value of the strength of the current is higher than the associated threshold value.

In some embodiments, the instantaneous strength of the current in the camshaft adjuster is reduced until the mean value of the measured strength of the current is lower than the associated threshold value.

In some embodiments, the engine block temperature of the internal combustion engine or the oil temperature of the internal combustion engine is measured as the ambient temperature of the camshaft adjuster.

In some embodiments, in order to reduce the instantaneous strength of the current a static setpoint value is specified for the camshaft position.

In some embodiments, in order to reduce the instantaneous strength of the current the dynamics of the setpoint value for the camshaft position of the camshaft adjuster are reduced.

In some embodiments, before the control unit is switched off, the calculated mean values of the measured strength of the current and information about the respectively associated timebase are stored in a non-volatile memory.

In some embodiments, when the internal combustion engine is switched off, a holding phase of the control unit is activated and the holding phase is ended when the mean value of the measured strength of the current is less than a predefined minimum value.

In some embodiments, in which in the case of a restart of the control unit which takes place after the expiry of the holding phase and when there is an intact non-volatile memory, new mean values of the strength of the current are initialised as a function of the shut-down time of the internal combustion engine.

In some embodiments, the initialisation is performed according to the following relationship:

$$I_n = (1 - T_{ab}/n) \cdot I_{nm},$$

where $I_n$ is the newly initialised mean value, n is a timebase, $T_{ab}$ is the shutting-down time of the internal combustion engine, and $I_{nm}$ is the mean value of the current at the time of the preceding shutting down of the internal combustion engine.

In some embodiments, in the case of a restart of the control unit which takes place after resetting of the control unit and/or a defect in the non-volatile memory, new mean values of the strength of the current which correspond to the threshold value stored in the characteristic diagram are initialised.

As another example, some embodiments include a device for actuating a camshaft adjuster of an internal combustion engine, which has a control unit (2) which is designed to control a method as described above.

In some embodiments, there is a characteristic diagram memory (2a) in which a multiplicity of threshold values are stored, wherein each threshold value is assigned to a combination of a timebase and an ambient temperature.

In some embodiments, there is a non-volatile memory (2b) which is designed to store the mean values of the measured strength of the current and a respectively associated information item about the predefined time base which is associated with the mean value.

BRIEF DESCRIPTION OF THE DRAWINGS

Further characteristics of various embodiments of the teachings herein will emerge from the explanation thereof below on the basis of the figures. In the figures:

FIG. 3 shows a flow diagram of a device for actuating a camshaft adjuster of an internal combustion engine incorporating teachings of the present disclosure.

DETAILED DESCRIPTION

Figures 1, 2:
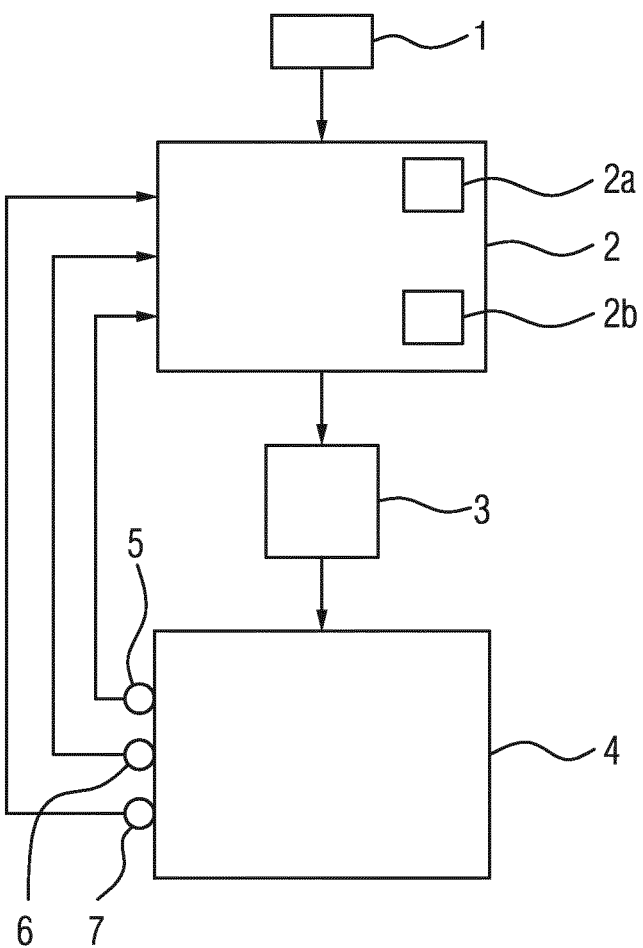
FIG. 1 shows a block illustration of a device for actuating a camshaft adjuster of an internal combustion engine incorporating teachings of the present disclosure.
FIG. 2 shows a diagram illustrating an exemplary embodiment of a characteristic diagram which is stored in the characteristic diagram memory incorporating teachings of the present disclosure.

Some embodiments of the teachings herein include a method for actuating a camshaft adjuster of an internal combustion engine, in which a flow of current is generated in an electric motor of the camshaft adjuster, the following steps are carried out:
measuring the instantaneous strength of the current in the camshaft adjuster,
calculating a mean value of the measured strength of the current for a predefined timebase,
measuring the ambient temperature of the camshaft adjuster,
comparing the mean value of the measured strength of the current with a threshold value which is obtained from a characteristic diagram memory and is associated with the measured ambient temperature and the predefined timebase, and
reducing the instantaneous strength of the current in the camshaft adjuster if the calculated mean value of the strength of the current is higher than the associated threshold value.

By means of such a method, the camshaft adjuster of an internal combustion engine may be protected against thermal overloading and a failure which is associated therewith. Furthermore, the starting capability of the internal combustion engine remains guaranteed.

FIG. 1 shows a block illustration of a device for actuating a camshaft adjuster of an internal combustion engine. The illustrated device has a start/stop command generator 1, a control unit 2, a characteristic diagram memory 2a, a non-volatile memory 2b, an electric motor 3 of the camshaft adjuster, an adjustment unit 4 of the camshaft adjuster, a current sensor 5, a temperature sensor 6 and an actual position sensor 7. All of the above-mentioned components are parts of an internal combustion engine. The electric motor 3 and adjustment unit 4 together form the camshaft adjuster.

The control unit 2 is designed to carry out a method for actuating the camshaft adjuster in which a flow of current is generated in the electric motor 3. In this method, the control unit 2 determines actuation signals for the electric motor 3 in such a way that a flow of current occurs in the electric motor 3 of the camshaft adjuster.

The control unit 2 determines the specified actuation signals for the electric motor 3 using the output signals of a plurality of sensors, which include a current sensor 5, a temperature sensor 6 and an actual position sensor 7. The current sensor 5 is provided for measuring the instantaneous strength of current in the electric motor 3 of the camshaft adjuster. The current sensor 6 is provided for measuring the ambient temperature of the camshaft adjuster. For this purpose, said temperature sensor 6 measures, for example as an ambient temperature of the camshaft adjuster, the engine block temperature of the internal combustion engine or the oil temperature of the internal combustion engine. The actual position sensor 7 makes available information about the instantaneous actual position of the camshaft to the control unit 2. This instantaneous actual position is the rotational position of the camshaft relative to an end stop.

In some embodiments, the control unit 2 uses the data and information which is contained in the characteristic diagram memory 2a, in a characteristic diagram 8 stored there to determine the actuation signals, which data and information is not stored in the non-volatile memory 2b. Through an evaluation of the above-mentioned output signals of the sensors, of the data which is obtained from the characteristic diagram memory and of the data stored in the non-volatile memory, the control unit 2 determines whether or not there is a risk of thermal overloading of the camshaft adjuster owing to the instantaneous operating state of the internal combustion engine. If this is the case, the control unit 2 initiates measures to reduce the instantaneous strength of current in the electric motor 3 of the camshaft adjuster, in order to guarantee and ensure protection of the components of the camshaft adjuster such that the temperature prevailing in the electric motor 3 of the camshaft adjuster is kept below a maximum permissible temperature.

In some embodiments, the control unit 2 makes use of the fact that the temperature prevailing in the electric motor 3 of the camshaft adjuster depends essentially on the instantaneous strength of the current flowing through the electric motor 3 of the camshaft adjuster, the duration of the flow of current through the electric motor 3 of the camshaft adjuster and the ambient temperature of the camshaft adjuster. The strength and the duration of the current flowing through the electric motor 3 of the camshaft adjuster determine the input of heat into the camshaft adjuster by means of the electrical resistance. The temperature of the surroundings of the camshaft adjuster into which the camshaft adjuster outputs its heat determines the output of heat from of the camshaft adjuster. Therefore, by reducing the instantaneous strength of the current flowing through the electric motor 3 of the camshaft adjuster while taking into account the ambient temperature and the history of the energization of the camshaft adjuster, the temperature of the camshaft adjuster can be effectively limited without unnecessarily restricting the availability of the camshaft adjuster.

The current flowing through the electric motor 3 of the camshaft adjuster is measured or determined and mean values are subsequently formed for this current over a specific time as a function of the ambient temperature, as a thermal model of the electric drive of the camshaft adjuster. The mean value of the strength of the current over a specific time period before the current point in time is used as a measure of the history of the energization of the camshaft adjuster, wherein this time period is referred to as the timebase. A maximum permissible average strength of current through the electric drive 3 of the camshaft adjuster is specified as a function of the timebase for averaging the current and the ambient temperature of the electric drive and is stored as a characteristic diagram in the characteristic diagram memory 2a.

FIG. 2 shows a diagram illustrating an exemplary embodiment of a characteristic diagram which is stored in the characteristic diagram memory 2a. In this characteristic diagram, in each case a value of the strength of the current which is the maximum strength of the current which is permissible for the respective combination is stored for a multiplicity of combinations of an ambient temperature T of the camshaft adjuster and a specific timebase t. In the exemplary embodiment shown, 0° C., 80° C., and 120° C. are specified as ambient temperatures. In the exemplary embodiment shown, 1 sec, 10 sec, 30 sec, 60 sec, 120 sec, 300 sec and 600 sec are specified as timebases t. The maximum permissible strength of current at 80° C. and a duration of the averaging of the flow of current of 10 sec occur at 40 A, and at 120° C. and with a duration of the averaging of 30 sec it occurs at 22 A.

If this maximum permissible average strength of current is exceeded, the resulting overheating can cause a defect in the camshaft adjuster and failure thereof. The current demand for holding an adjusted camshaft position is far below this maximum permissible average strength of current, and therefore current limiting occurs only during the adjustment but not during the holding of the position.

If the mean value of the current determined by means of the respective timebase (=duration) exceeds, while the internal combustion engine is operating, the associated threshold value stored in the characteristic diagram 8, the control unit 2 initiates measures in order to bring about cooling of the camshaft adjuster. Such cooling of the camshaft adjuster can be brought about by virtue of the fact that the control unit 2 specifies a constant setpoint value of the camshaft position (e.g. ideal camshaft position for the start of the internal combustion engine). This constant setpoint position avoids a high flow of current which is necessary for the adjustment.

In some embodiments, cooling of the camshaft adjuster can also be brought about by virtue of the fact that the control unit 2 limits the dynamics of the setpoint value for the camshaft position. This reduced dynamic position avoids a high flow of current which is necessary for the quick adjustment. In order to further increase the protection against thermal overloading of the camshaft adjuster when the internal combustion engine is shut down, the thermal model of the camshaft adjuster described above, i.e. the mean values of the strength of the current and the respectively associated timebase which are determined directly before the shutting down, may be prevented from being reset immediately. This is because when such immediate resetting occurs, in the event of a restart of the internal combustion engine brought about shortly after the shutting down the start values which are usually employed for a cold start would not be adapted to the actual instantaneous operating state of the internal combustion engine. In this case, and in particular also in the case of a plurality of restarts, thermal overloading of the camshaft adjuster could occur.

In order to avoid this, before the control unit 2 is shut down the most recently obtained mean values of the measured strength of current and information about the respectively associated timebase are stored in the non-volatile memory 2b. When there is a restart of the control unit 2 which takes place with an intact non-volatile memory 2b, new mean values of the strength of the current are initialised for all the timebases as a function of the shut-down time of the internal combustion engine. This initialisation is performed according to the following relationship:

$$I_n = (1 - T_{ab}/n) \cdot I_{nm},$$

wherein $I_n$ is the newly initialised mean value, n is the respective timebase, $T_{ab}$ is the shut-down time of the internal combustion engine and $I_{nm}$ is the mean value of the current at the time of the preceding shut down of the internal combustion engine.

In the event of a restart of the control unit which occurs after undesired resetting of the control unit 2 and/or after a defect of the non-volatile memory 2b, new mean values of the strength of the current, which correspond to the threshold value stored in the characteristic diagram, are initialized for all the timebases.

In some embodiments, as an alternative to the use of a non-volatile memory, before the control unit 2 is switched off a holding phase is activated and maintained until the mean value of the measured strength of the current for all the timebases corresponds to a minimum value. The measures described protect the the camshaft adjuster against thermal overloading, and also the starting capability of the internal combustion engine.

FIG. 3 shows a flow diagram of a method for actuating a camshaft adjuster of an internal combustion engine. In this method, a start of the control unit 2 takes place in a step S1.

After this, in a step S2 there is an interrogation as to whether a regular or an irregular start occurs. A regular start occurs if:

1) the start takes place after the expiry of the holding phase of the control unit 2 when the holding phase described above is used or 2) the start takes place when there is an intact non-volatile memory 2b and the non-volatile memory described above is used.

An irregular start occurs if the start takes place after undesired resetting of the control unit 2 and/or when there is a defect present in the non-volatile memory 2b. If this interrogation in step S2 reveals that a regular start occurs, the system proceeds to a step S3 in which initialisation takes place according to the relationship already specified above:

$$I_n = (1 - T_{ab}/n) \cdot I_{nm}.$$

In contrast, if this interrogation in step S2 reveals that an irregular start occurs, the system proceeds to a step S4 in which initialisation takes place with new mean values of the strength of the current for all the timebases, said mean values corresponding to the threshold values stored in the characteristic diagram 8.

After this initialisation in step S3 or in step S4, the system proceeds to a step S5. In this step S5, the instantaneous strength of the current in the camshaft adjuster is measured by means of the current sensor 5. As an alternative to this, the strength of the current can also be determined using modelling on the basis of the actuation of the electric drive.

After this, in a step S6 a mean value of the measured strength of the current is calculated for the respective timebase.

After this, in a step S7 an interrogation takes place as to whether the calculated mean value of the strength of the current is higher than the respectively associated threshold value stored in the characteristic diagram memory. If this interrogation reveals that the calculated mean value of the strength of the current is higher than the associated threshold value stored in the characteristic diagram, the system proceeds to a step S8 in which the instantaneous strength of the current in the camshaft adjuster is reduced.

On the other hand, if this interrogation reveals that the calculated mean value is not higher than the associated threshold value stored in the characteristic diagram 8, the system proceeds to a step S9 in which setpoint positions are determined according to a normal operating mode of the camshaft adjuster.

After this, the system proceeds from step S8, or from step S9, to a step S10. In this step S10, the actual position of the camshaft, i.e. the instantaneous rotational position of the camshaft relative to the end stop, is determined using the actual position sensor 7.

After this determination of the actual position of the camshaft adjuster 4, the control error, i.e. the deviation of the actual position of the camshaft adjuster from the respectively specified setpoint position, is calculated in a step S11.

From this calculated control error, an actuation signal, corresponding to the calculated control error, for the electric motor 3 is calculated in a following step S12. After the step S12, a jump back to the step S5 occurs.

In light of what has been stated above, the method and the device described above protect the camshaft adjuster of an internal combustion engine against thermal overloading and against failure which possibly results therefrom, as well as the starting capability of the internal combustion engine.

LIST OF REFERENCE NUMERALS

1 Start/Stop command generator
2 Control device
2a Characteristic diagram memory
2b Non-volatile memory
3 Electric motor
4 Camshaft adjuster
5 Current sensor
6 Temperature sensor
7 Actual position sensor
8 Characteristic diagram

What is claimed is:

1. A method for actuating a camshaft adjuster of an internal combustion engine, in which a current is generated in an electric motor of the camshaft adjuster, the method comprising:
measuring an instantaneous strength of the current;
calculating a mean value of the measured strength of the current over a predefined elapsed time;
measuring a temperature of the camshaft adjuster;
comparing the mean value of the measured strength of the current to a threshold value obtained from a characteristic diagram stored in a memory, the threshold value corresponding to the measured temperature and the predefined elapsed time; and
reducing the current if the calculated mean value of the strength of the current is higher than the threshold value;
wherein reducing the instantaneous strength of the current includes at least one technique selected from the group consisting of: (a) using a predefined static setpoint value for the camshaft position and (b) reducing the dynamics of the setpoint value for the camshaft position.

2. The method as claimed in claim 1, further comprising reducing the instantaneous strength of the current until the mean value is lower than the threshold value.

3. The method as claimed in claim 1, wherein the temperature comprises an engine block temperature or an oil temperature.

4. The method as claimed in claim 1, further comprising storing the calculated mean values and information about the elapsed time in a non-volatile memory.

5. A method for actuating a camshaft adjuster of an internal combustion engine, in which a current is generated in an electric motor of the camshaft adjuster, the method comprising:
measuring an instantaneous strength of the current;
calculating a mean value of the measured strength of the current over a predefined elapsed time;
measuring a temperature of the camshaft adjuster;
comparing the mean value of the measured strength of the current to a threshold value obtained from a characteristic diagram stored in a memory, the threshold value corresponding to the measured temperature and the predefined elapsed time;
reducing the current if the calculated mean value of the strength of the current is higher than the threshold value; and
when the internal combustion engine is switched off, activating a holding phase, then ending the holding phase when the mean value of the measured strength of the current is less than a predefined minimum value.

6. The method as claimed in claim 5, further comprising:
restarting a control unit after expiry of the holding phase; and
when there is an intact non-volatile memory, initializing new mean values of the strength of the current as a function of the shut-down time of the internal combustion engine.

7. The method as claimed in claim 6, further comprising performing the initialisation according to the following relationship:

$$I_n = (1 - T_{ab}/n) \cdot I_{nm},$$

where
$I_n$ is the newly initialised mean value,
n is a timebase,
$T_{ab}$ is the shutting-down time of the internal combustion engine, and
$I_{nm}$ is the mean value of the current at the time of the preceding shutting down of the internal combustion engine.

8. A method for actuating a camshaft adjuster of an internal combustion engine, in which a current is generated in an electric motor of the camshaft adjuster, the method comprising:
measuring an instantaneous strength of the current;
calculating a mean value of the measured strength of the current over a predefined elapsed time;
measuring a temperature of the camshaft adjuster;
comparing the mean value of the measured strength of the current to a threshold value obtained from a characteristic diagram stored in a memory, the threshold value corresponding to the measured temperature and the predefined elapsed time;
reducing the current if the calculated mean value of the strength of the current is higher than the threshold value;
restarting a control unit after resetting the control unit and/or a defect in the non-volatile memory; and
initializing new mean values of the strength of the current which correspond to the threshold value stored in the characteristic diagram.

9. A device for actuating a camshaft adjuster of an internal combustion engine, the device comprising:
an electric motor; and
a control unit programmed to:
measure an instantaneous strength of the current;

calculate a mean value of the measured strength of the current over a predefined elapsed time;

measure a temperature of the camshaft adjuster;

compare the mean value of the measured strength of the current to a threshold value obtained from a characteristic diagram stored in a memory, the threshold value corresponding to the measured temperature and the predefined elapsed time; and reduce the current if the calculated mean value of the strength of the current is higher than the threshold value;

wherein reducing the instantaneous strength of the current includes at least one technique selected from the group consisting of: (a) using a predefined static setpoint value for the camshaft position and (b) reducing the dynamics of the setpoint value for the camshaft position.

10. The device as claimed in claim 9, further comprising a characteristic diagram memory storing a multiplicity of threshold values, wherein each threshold value is assigned to a combination of an elapsed time period and an ambient temperature.

11. The device as claimed in claim 9, further comprising a non-volatile memory storing the mean values of the measured strength of the current and a respectively associated information item about the predefined elapsed time associated with the mean value.

* * * * *